United States Patent [19]

Knittel

[11] Patent Number: 4,688,230

[45] Date of Patent: Aug. 18, 1987

[54] CONSTRUCTION LASER, IN PARTICULAR CANAL CONSTRUCTION LASER

[75] Inventor: Ronald Knittel, Gross-Umstadt, Fed. Rep. of Germany

[73] Assignee: AGL Bau-Laser Gerate Vertriebs GmbH, Fed. Rep. of Germany

[21] Appl. No.: 826,294

[22] Filed: Feb. 5, 1986

[30] Foreign Application Priority Data

Feb. 15, 1985 [DE] Fed. Rep. of Germany ... 3504239[U]
Apr. 19, 1985 [DE] Fed. Rep. of Germany ....... 3511685

[51] Int. Cl.⁴ ........................... H01S 3/02; G01C 3/00
[52] U.S. Cl. .................................... 372/109; 356/153; 356/399
[58] Field of Search ................ 372/109; 356/138, 153, 356/399; 33/286

[56] References Cited

U.S. PATENT DOCUMENTS 3,631,601  1/1972  McNulty ............................ 356/153
4,053,238 10/1977  George et al. ...................... 356/138

Primary Examiner—James W. Davie
Assistant Examiner—Bertha R. Randolph
Attorney, Agent, or Firm—Orrin M. Haugen; Thomas J. Nikolai; Frederick W. Niebuhr

[57] ABSTRACT

A construction laser, in particular a canal construction laser, includes a water-tight housing (1), with a tubular central section (3) and face-side end sections (5). At least three adjustment feet (13,23) serve as an adjusting means, with two adjustment feet (13) lying closer to one face end and at least one more third adjustment foot (13,23), offset in the axial direction thereto, lying closer to the opposite face end of the housing (1). The two adjustment feet are positioned transversely to the longitudinal axis next to one another and held in guide slots (11) in inwardly and outwardly displaceable and lockable fashion. To obtain a construction laser that is embodied in a simpler fashion, while avoiding a cast housing, and such laser further outfitted with an easily manipulable adjusting means in the form of adjustment legs displaying a high degree of security, the invention provides that the housing central section (3) consist of a non-cast formed body and that the guide slots (11) and the two adjustment feet (13) lying next to one another and held in displaceable fashion therein, be formed, as viewed from the front, in arcuate-cutout fashion, in convex alignment toward the vertical plane of symmetry (9) of the construction laser.

7 Claims, 2 Drawing Figures

CONSTRUCTION LASER, IN PARTICULAR CANAL CONSTRUCTION LASER

BACKGROUND OF THE INVENTION

The invention concerns a construction laser, in particular a canal construction laser.

These types of lasers are becoming of increasing importance in industry. In particular, when laying pipes, construction lasers have proven themselves in practice, enabling in simple fashion and manner, an exact, linear alignment of the pipes to be laid. These construction lasers are designed as compact, essentially tubularly embodied devices, provided with a three-point or four-point adjusting means.

This adjustment means comprises two adjustment feet lying next to each other and, offset in the axial direction thereto, one or more displaceably journaled adjustment feet. Also, the construction laser is produced from a cast aluminum body with guide slots located at the peripheral jacket, into which are set the adjustment feet. The position of the adjustment feet can be fixed with knurled-head screws provided on the outer jacket. Since the adjustment feet can be raised and pushed out in these vertical slots, they are further provided with a bend in order to enable a broader support. The third adjustment foot, offset thereto in the axial direction, is placed, with its bend, in the guide slot provided at the outer jacket, such that its lower, bent supporting surface arm runs underneath the construction laser up to its vertical plane of symmetry and rests centrally under the construction laser. However, this arrangement displays several disadvantages. Since the construction lasers must be designed completely watertight, it is required that a cast housing have integral guide slots at the peripheral jacket. However, these types of cast housings are relatively expensive. Moreover, as frequently claimed by construction workers, the adjustment legs are held in displaceable fashion in the vertical guide slot at the outer periphery, are frequently placed offset by 180°, so that their support leg which should extend outwardly away from the vertical plane of symmetry, instead lies under the construction laser toward its vertical plane of symmetry, such that the two support points of the adjustment feet lie in the immediate vicinity to one another. No sufficient stability is given by this, so that the construction laser, along with its entire electronics, can be damaged when falling over.

Also known are other construction lasers with which have threaded legs for adapting to a pipe diameter for exact alignment of the laser beam. These legs can be screwed out and be replaced by appropriate, new threaded legs displaying a different length. This process, however, is still expensive.

SUMMARY OF THE INVENTION

In contrast to this, the task for the present invention is to a construction laser, in particular a canal construction laser, which, while avoiding a cast housing, is embodied more simply and, additionally, is equipped with an easily manipulable adjustment means displaying a high degree of safety, in the form of adjustable legs. The task is resolved in accordance with the invention based on the features given in the characterizing part of claim 1. Advantageous embodiments of the invention are given in the subclaims.

Achieved by the present invention, in surprisingly simple fashion, is an important technical step forward. It is no longer required that the central section of the housing consist of a cast body with lateral, vertical slots for insertion of the adjustment feet. Here, made in an arcuatecutout form at the end sections, as viewed from the front, are the guide slots into which are placed the corresponding arcuate adjustment feet.

This insures that an insertion of the adjustment feet is possible only in an exactly defined position.

Since their convex sections face toward the vertical plane of symmetry of the construction laser, the support sections come to rest laterally offset outwardly, so that a high degree of stability is achieved.

Although the guide slots mentioned can be milled in arcuate-cutout form, out from the outer jacket in the case of a thick floor section, at the front end of the housing central section, in one preferred form of embodiment of the invention based on claim 2, the guide slots are made on the front side, at the end section of the housing central section.

Claims 3 to 5 in turn concern an advantageous further development of the embodiment of the end sections of the housing with the corresponding locking means.

In a further development of the invention according to claim 6, also capable of being provided is that possiobly the third and/or the third and fourth adjustment foot be displaceably mounted on the construction laser in a manner similar to that in the case of two adjustment feet lying next to each other as preceedingly described.

IN THE DRAWING

Further advantages, particulars and features of the invention are obtained from the following embodiment represented with the aid of drawings, in which:

FIG. 1 is a schematic front view onto a construction laser with the adjustment means comprising the adjustment feet; and FIG. 2 is a side view of the front-side end of the construction laser shown in FIG. 1.

DESCRIPTION OF THE PREFERRED EMBODIMENT

Figure 1:
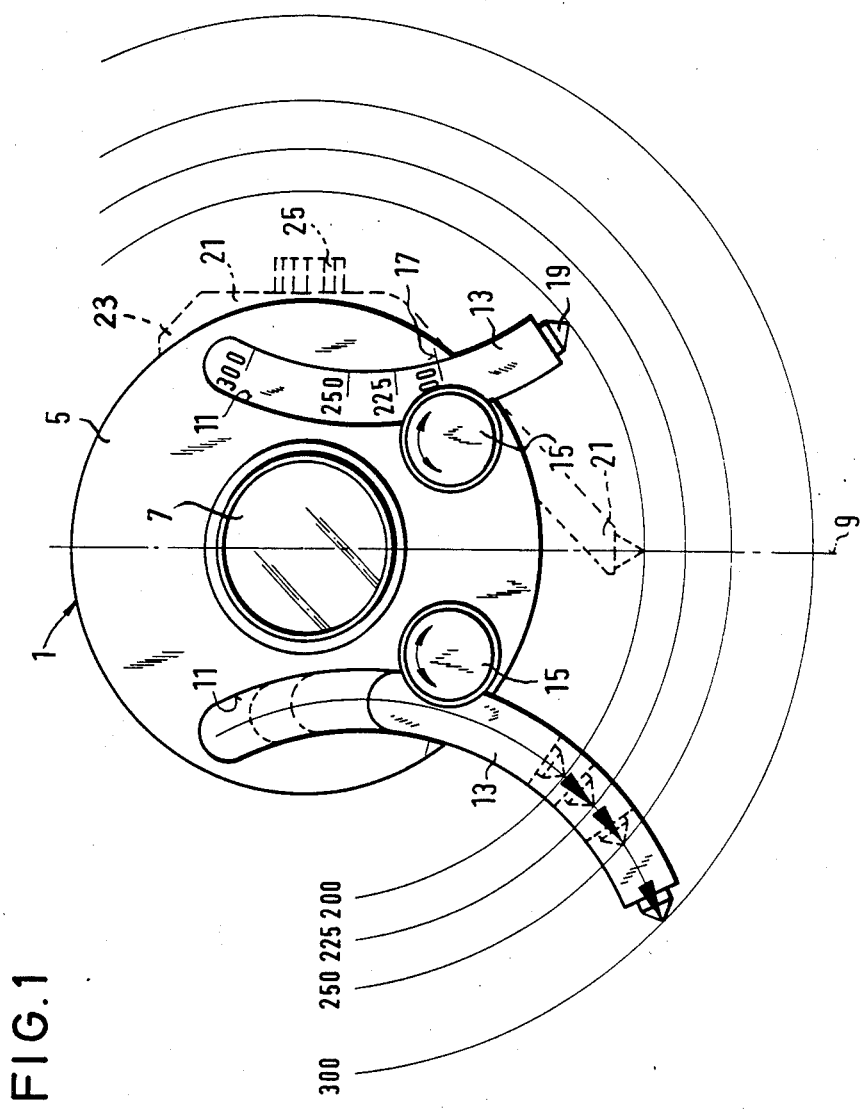
Figure 2:
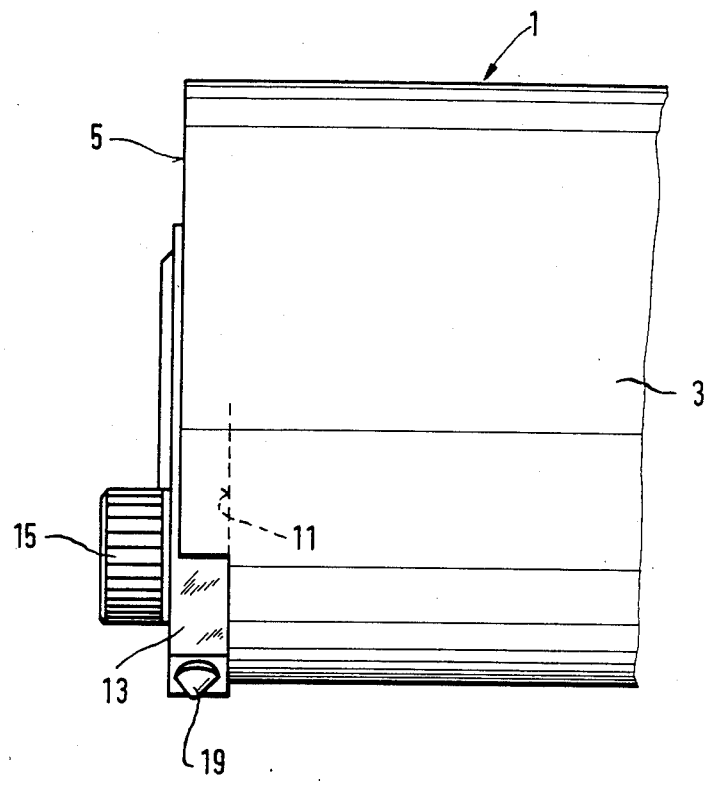

Shown in FIGS. 1 and 2 is a tubular canal construction laser with a housing 1. The housing is divided into a middle, central housing section 3 (FIG. 2) and respectively two oppositely lying end sections, of which is shown only the one front-side end section 5. The end section 5 can consist of a separate component that is sealed against the housing central section 3. However, it is possible that the housiong central section be formed with a relatively thick end section representing a floor, in one-piece construction.

As can be seen in particular in a front view of FIG. 1, provided laterally from the outlet lens 7 for the laser beam, on the forward side of the end section 5 laterally to the vertical plane of longitudinal symmetry 9, are two curved guide slots 11 whose convexly curved sections of arc face toward the vertical plane of longitudinal symmetry 9.

Inserted into these guide slots 11 are correspondingly formed inwardly and outwardly displaceable adjustment feet 13. As seen from FIG. 2, the guide slots 11 and the adjustment feet 13 are rectangular in cross-section. Other configurations of the cross-section are, however, also possible.

Each one of the two adjustment feet 13 shown in FIGS. 1 and 2 can be fixed by means of locking screws 15 provided on the face side of the end section 5, for example by means of the knurled-knob projecting over each of the adjustment feet 13.

In the embodiment according to FIG. 1, each one of the top ends of the guide slots 11 is limited. The guide slots 11 could, however, continue to the top edge of end section 5, so that the adjustment feet 13, at least over one part of the length, could also project past the guide slots 11 at the top end. This would increase the adjustment range.

Shown only at the right hand adjustment foot 13 in FIG. 1, is a measurement scale that cooperates with a marking 17 placed at the face-side of end section 5.

In order to obtain an exact adjustment, the underside of each adjustment foot 13 has a conical support foot 19. Two additional adjustments feet similar to feet 13 an be provided at the oppositely lying face-side end section 5 to obtain a four-point support. Alternatively, at the oppositely lying end, is a single adjustment foot which, for example, is likewise configured to be arcuate and placed in a corresponding guide slot. In this case, it is recommended that the curved guide slot come out in the lower region and at least close to the point of intersection of the vertical plane of longitudinal symmetry 9 with the peripheral jacket of the housing 1, so that the third adjustment foot 13 can, in turn, support the housing as close as possible to the center.

Alternatively, provided over a section of curvature is an adjustment foot 23 comprising two leg sections 21, said adjustment foot being shown in FIG. 1 merely with a broken line.

Adjustment foot 23 is seated in a guide slot made vertically in the outer peripheral jacket of the housing 1, and fixed there by a knurled-head screw 25 attached to the peripheral jacket of the housing 1. The lower bent leg section 21 is bent toward the vertical plane of longitudinal symmetry 9 so that its support foot 19 rests in the vertical plane of longitudinal symmetry 9. Pushing in and pushing out this third adjustment 23 is the lower alignment of the construction laser.

The following explains the adjustment of the laser.

If, for example, the laser is inserted in a pipe having a diameter of 200 mm, then, after loosening the locking screws 15, both adjustment feet shown in FIGS. 1 and 2 are pushed in and/or pushed out until the corresponding reading of "200" on each adjustment foot 13 comes to rest next to the marking 17. In this case, the lowermost tip of the support foot 19 lies on a circle having a diameter of 200 mm. By adapting to a pipe having a greater diameter, the adjustment feet, after loosening the locking screws 15 beforehand, can again be pushed out and/or in to the desired position and again secured by firmly drawing down the locking screws 15. Besides the inner setting, FIG. 1 also shows another position of the foot in adaptation to a pipe internal diameter of 300 mm. Further highlighted here, as an example, are two intermediate settings for the pipe diameters of 225 mm and 250 mm.

Because of the arcuate configuration of the guide slots and the adjustment feet 13, the feet cannot be set in nor installed in reversed position with the support feet 19 pointing inwardly toward one another. Guaranteed by this is an extremely simple, foolproof, manipulation at the construction site.

By appropriate actuation of the two other adjustment feet at the oppositely lying end of the construction laser, adjustment is then concluded.

I claim:

1. A construction laser with a water-tight housing (1) having a vertical plane of longitudinal symmetry (9) and consisting of preferentially tubular housing central section (3) and face-side end sections (5) and at least one adjusting means comprising three adjustment feet (13, 23), wherewith two first ones of said adjustment feet (13) lie closer to one end section and at least a second one of said adjustment feet (13, 23), offset in the axial direction therefrom, lies closer to the opposite-lying end section of the housing (1), with the two first adjustment feet (13) positioned transversely from the vertical plane of longitudinal symmetry, opposed to one another and held in inwardly and outwardly displaceable and lockable fashion in associated guide slots (11) formed in said housing on opposite sides of the vertical plane of longitudinal symmetry, characterized by the fact that: the housing central section (3) consists of a non-cast formed body; each of the associated guide slots (11) is arcuate, with its convex section of arc facing the vertical plane of longitudinal symmetry; and each of the first adjustment feet (13) has an arcuate shape corresponding to the arcuate shape of its associated guide slot whereby each first adjustment foot is held in displaceable fasion in and along its associated one of the guide slots.

2. The construction laser according to claim 1, characterized in that the guide slots (11) are made in the end sections (5), cut out from the face side.

3. The construction laser according to claim 1, characterized in that the guide slots (11) reaching up to the outer periphery are limited at their top ends lying opposite to the out-travel region of the adjustment feet (13).

4. The construction laser according to claim 1, further including a locking screw (15) for fixing the adjustment of each one of the first feet (13), characterized in that the locking screws (15) are installed on the face side of the end section (5).

5. The construction laser according to claim 4, characterized in that the locking screws (15) hold the locking feet (13) in firmly clamped fashion upon movement of said locking screws in the axial direction toward the housing central section.

6. The construction laser according to claim 1, characterized in that at least a third adjustment foot (13) provided at the oppositely lying end section facing toward the two first adjustment feet (13) is also formed with an arcuate shape, and is firmly held in a corresponding guide slot (11).

7. The construction laser according to claim 1 characterized to include means, on at least one of said first adjustment feet, forming a measurement scale representing a plurality of nominal pipe diameters, and a marking on said housing positioned to indicate, in cooperation with said measurement scale, the displacement of said first adjustment foot to a setting corresponding to one of said nominal diameters.

* * * * *